(12) United States Patent
Mitsunaga et al.

(10) Patent No.: US 11,431,223 B2
(45) Date of Patent: Aug. 30, 2022

(54) ROTARY ELECTRIC MACHINE

(71) Applicant: Mitsubishi Electric Corporation, Tokyo (JP)

(72) Inventors: Satoshi Mitsunaga, Tokyo (JP); Daisuke Sasaki, Tokyo (JP); Masayuki Sakaguchi, Tokyo (JP); Shinya Nose, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 16/959,200

(22) PCT Filed: Jan. 17, 2018

(86) PCT No.: PCT/JP2018/001222
§ 371 (c)(1),
(2) Date: Jun. 30, 2020

(87) PCT Pub. No.: WO2019/142263
PCT Pub. Date: Jul. 25, 2019

(65) Prior Publication Data
US 2020/0412199 A1   Dec. 31, 2020

(51) Int. Cl.
*H02K 7/10* (2006.01)
*H02K 1/24* (2006.01)
(Continued)

(52) U.S. Cl.
CPC ........... *H02K 7/1004* (2013.01); *H02K 1/243* (2013.01); *H02K 7/003* (2013.01); *H02K 7/083* (2013.01)

(58) Field of Classification Search
CPC ...... H02K 7/1004; H02K 1/243; H02K 7/003; H02K 7/083
(Continued)

(56) References Cited

U.S. PATENT DOCUMENTS

| 5,195,241 A | 3/1993 | Bradfield |
| 2003/0048035 A1 | 3/2003 | Oohashi et al. |

(Continued)

FOREIGN PATENT DOCUMENTS

| CN | 1639946 | * | 7/2005 |
| CN | 102647067 A | | 8/2012 |

(Continued)

OTHER PUBLICATIONS

International Search Report of PCT/JP2018/001222 dated Mar. 13, 2018 [PCT/ISA/210].

(Continued)

*Primary Examiner* — Terrance L Kenerly
(74) *Attorney, Agent, or Firm* — Sughrue Mion, PLLC; Richard C. Turner (57) ABSTRACT

Provided is a rotating electric machine, including: a rotary shaft rotatably supported by a front bearing and a rear bearing; a field core firmly fixed to the rotary shaft; and a pulley fitted over the rotary shaft on one end side so as to be rotatable integrally with the rotary shaft. In the rotating electric machine, the pulley, the front bearing, and the field core are arranged in a stated order from the one end side of the rotary shaft toward another end side of the rotary shaft. The pulley is fastened to the rotary shaft with use of a male thread formed on the one end side of the rotary shaft and a nut to be mounted to the male thread. The rotary shaft has a flange portion, which projects radially outward, and is arranged to a position between the front bearing and the field core in an axial direction of the rotary shaft.

9 Claims, 9 Drawing Sheets

(51) Int. Cl.
  *H02K 7/00* (2006.01)
  *H02K 7/08* (2006.01)
(58) Field of Classification Search
  USPC .......................................................... 310/80
  See application file for complete search history.

(56) References Cited

U.S. PATENT DOCUMENTS

| | | | |
|---|---|---|---|
| 2005/0119077 A1 | 6/2005 | Faucon et al. | |
| 2009/0158576 A1 | 6/2009 | Pfleger et al. | |
| 2016/0056677 A1 | 2/2016 | Ikuta | |
| 2016/0380508 A1 | 12/2016 | Kocevar et al. | |

FOREIGN PATENT DOCUMENTS

| | | | | |
|---|---|---|---|---|
| CN | 107251379 | * | 10/2017 | ............... H02K 9/06 |
| FR | 2813105 | A1 | 2/2002 | |
| FR | 3068408 | A1 | 1/2019 | |
| JP | 11-108159 | A | 4/1999 | |
| JP | 2000-278906 | A | 10/2000 | |
| JP | 2000-328959 | A | 11/2000 | |
| JP | 2003-061307 | A | 2/2003 | |
| JP | 2006-311696 | A | 11/2006 | |
| JP | 2007228689 | * | 9/2007 | ............. H02K 7/003 |
| JP | 2009-089583 | A | 4/2009 | |
| JP | 2009-528494 | A | 8/2009 | |
| JP | 2016-046844 | A | 4/2016 | |
| JP | 2016201896 | A | 12/2016 | |
| JP | 2017-112775 | A | 6/2017 | |
| WO | 2006/118148 | A1 | 11/2006 | |

OTHER PUBLICATIONS

Communication dated Dec. 16, 2020, from the European Patent Office in European Application No. 18901751.0.
Communication dated May 7, 2022 from the Chinese Patent Office in Chinese Application No. 201880086188.2.

* cited by examiner

ROTARY ELECTRIC MACHINE

CROSS REFERENCE TO RELATED APPLICATIONS

This application is a National Stage of International Application No. PCT/JP2018/001222, filed Jan. 17, 2018.

TECHNICAL FIELD

The present invention relates to a controller-integrated type rotating electric machine in which a controller is mounted.

BACKGROUND ART

A controller-integrated type rotating electric machine in which a rotating electric machine is integrated with a controller, there is known an alternator for a vehicle (see, for example, Patent Literature 1). The alternator for a vehicle, which is described in Patent Literature 1, includes a field core, a spacer, a bearing component, and a pulley in the stated order from a counter-belt drive side as components to be provided to a rotary shaft together with a nut on a belt drive side being one free end of the rotary shaft.

Hitherto, in the alternator for a vehicle, an input torque is applied to the pulley from an engine side via a belt to rotate the pulley. When the pulley is rotated, the components mounted to the rotary shaft are rotated via a screw threaded on one end of the rotary shaft and the nut mounted on the screw. Specifically, the alternator for a vehicle has such a structure that, when the pulley is rotated, the pulley and the other fastened components can be integrally rotated by a frictional force generated between the pulley and ground contact surfaces of the other fastened components.

Further, the field core is configured so as not to be movable to the counter-belt drive side with respect to the rotary shaft. The following two structures are given as the reason thereof. The rotary shaft includes a flange portion, which is a portion having a larger diameter, on the counter-belt drive side of the rotary shaft along a terminal end surface of the field core on the counter-belt drive side, or the rotary shaft has knurling on an outer peripheral surface of a portion of an outer periphery of the rotary shaft, at which the core is located in contact therewith. With the structures described above, the field core and the rotary shaft are fixed to each other.

The rotary shaft as described above is configured to act like a bolt having the flange portion on the counter-belt drive side as a bolt head. Thus, the field core, the spacer, the bearing component, and the pulley are fastened with use of the nut and the flange portion of the rotary shaft or with use of the nut and the knurling of the rotary shaft. Further, a steel material containing a small carbon content is generally used for the field core for the purpose of improvement of magnetic characteristics. Thus, among the components fastened with use of the nut and the flange portion of the rotary shaft, the field core has a low strength.

CITATION LIST

Patent Literature

[PTL 1] JP 2017-112775 A

SUMMARY OF INVENTION

Technical Problem

However, the related art has the following problems. In the alternator for a vehicle, which is described in Patent Literature 1, when an excessive input torque is applied to the pulley, the frictional force generated on the ground contact surfaces of the fastened components between the rotary shaft and the nut is overwhelmed by the input torque. Thus, sliding of the pulley and drag of the nut occur. As a result, loosening of the nut may be caused thereby. Thus, there arises a problem in that dropping of the nut or the pulley may lead to an accident.

In the related art, the components to be fastened to the rotary shaft with use of the nut include the field core, the spacer, the bearing component, and the pulley. In this case, a soft material having a small carbon content is used for the field core. Hence, the field core has a relatively smaller yield stress than those of the other components. Thus, a tightening torque for the nut to be used is set to fall within a low range so as to prevent break down or damage of the field core.

In other words, with the related art, the tightening torque for the nut cannot be set sufficiently large. As a result, with the related art, the problems such as the loosening of the nut and unnecessary sliding of the pulley, which may be caused when an excessive input torque is applied, cannot be solved.

The present invention has been made to solve the problems described above, and has an object to provide a rotating electric machine having such a structure as to release a field core from an axial force to enable increase in tightening torque for a nut and the axial force for achievement of increase in force for restraining sliding of a pulley.

Solution to Problem

In order to solve the above-mentioned problems, according to one embodiment of the present invention, there is provided a rotating electric machine, including: a rotary shaft rotatably supported by a front bearing and a rear bearing; a field core firmly fixed to the rotary shaft; and a pulley fitted over the rotary shaft on one end side so as to be rotatable integrally with the rotary shaft, wherein the pulley, the front bearing, and the field core are arranged in a stated order from the one end side of the rotary shaft toward another end side of the rotary shaft, wherein the pulley is fastened to the rotary shaft with use of a male thread formed on the one end side of the rotary shaft and a nut to be mounted to the male thread, and wherein the rotary shaft has a flange portion, which projects radially outward and is arranged to be located between the front bearing and the field core in an axial direction of the rotary shaft.

Advantageous Effects of Invention

The rotating electric machine according to one embodiment of the present invention has such a structure that the flange portion having a diameter larger than that of the rotary shaft is arranged between the bearing and the field core so as to prevent the field core from being affected by an axial force generated by a tightening force for the nut. With the structure described above, the field core can be released from the axial force. As a result, a force for restraining sliding of the pulley can be increased by achievement of increase in torque of a tightening force for the nut and increase in frictional force generated by the axial force in the thread.

DESCRIPTION OF EMBODIMENTS

Now, a rotating electric machine according to embodiments of the present invention is described with reference to the accompanying drawings.

First Embodiment

Figure 1:
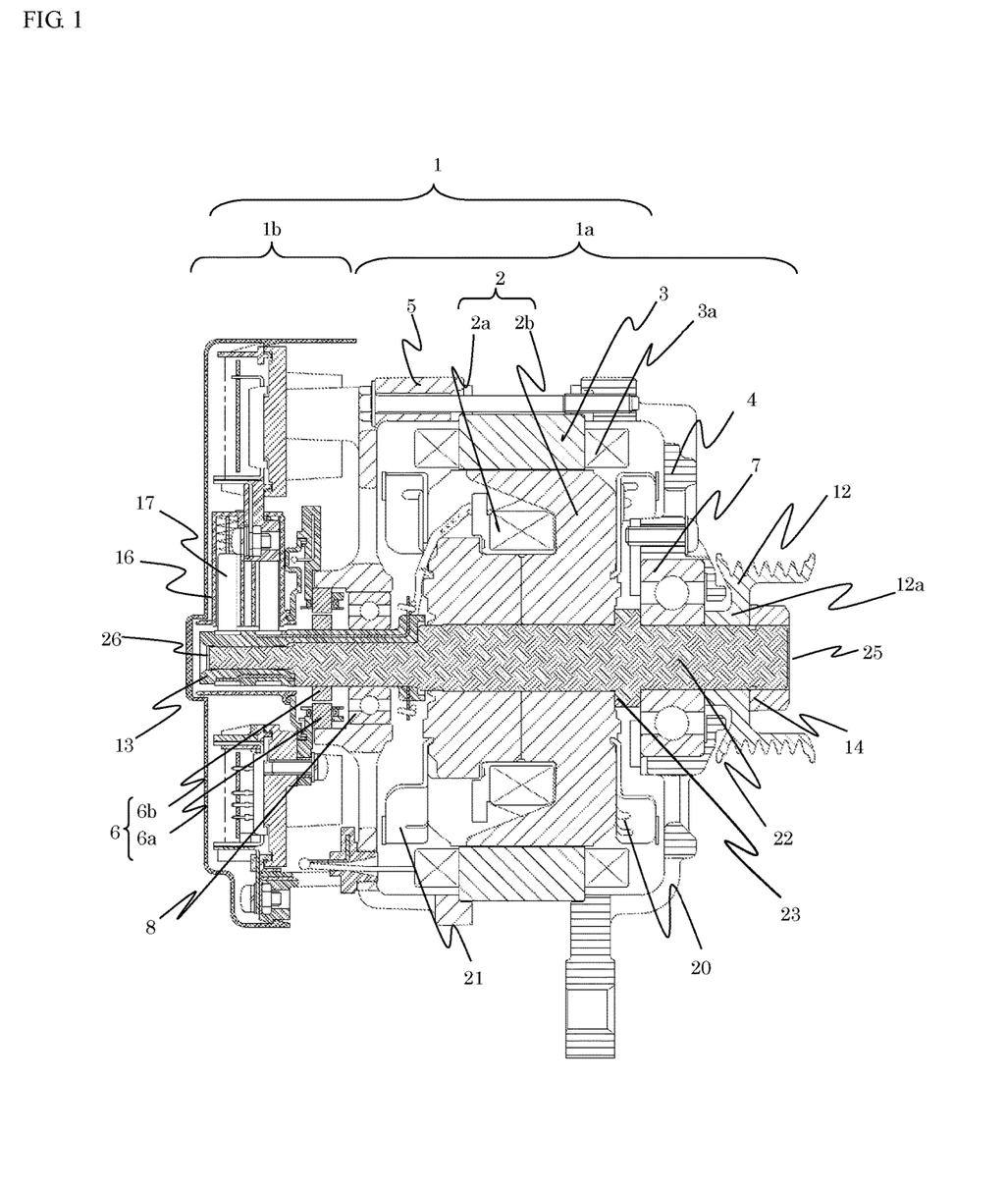
FIG. 1 is a sectional view of a rotating electric machine according to a first embodiment of the present invention.

FIG. 1 is a sectional view of a rotating electric machine according to a first embodiment of the present invention. The rotating electric machine according to the first embodiment is a controller-integrated type rotating electric machine, and is mounted in a vehicle to be used for driving assistance and power generation.

A controller-integrated type rotating electric machine 1 includes a rotating electric machine main body 1a and a controller 1b, which are integrated with each other. The rotating electric machine main body 1a includes a field core 2, a stator 3, a front bracket 4, a rear bracket 5, a front bearing 7, a rear bearing 8, cooling fans 20 and 21, and a rotary shaft 22.

A stator winding 3a is wound around the stator 3. The stator core 2 is provided on an inner periphery side of the stator 3. The field core 2 includes a field winding 2a wound around a core 2b. In the following description, the core 2b is also referred to as "field core 2b". The front bracket 4 and the rear bracket 5 are arranged at both ends of the stator 3 in an axial direction of the rotary shaft 22. The front bracket 4 and the rear bracket 5 are provided as a pair of brackets so as to support the stator 3.

The front bearing 7 is fixed to the front bracket 4. The rear bearing 8 is fixed to the rear bracket 5. The rotary shaft 22 is rotatably held by the front bearing 7 and the rear bearing 8. The rotary shaft 22 is fixed at a center of the field core 2. The rear bearing 8 may be press-fitted over the rotary shaft 8 so as to be fixed thereto.

The rotary shaft 22 according to the first embodiment has a flange portion 23 being a portion of the rotary shaft 22, which is formed to have a larger diameter. The front bearing 7 is arranged on one end side 25 of the rotary shaft 22 so as to be adjacent to the flange portion 23. Meanwhile, the field core 2 is arranged on another end side 26 of the rotary shaft 22 so as to be adjacent to the flange portion 23.

A male thread is formed on the one end side 25 of the rotary shaft, and a nut 14 is mounted thereto. The cooling fan 20 and the cooling fan 21, which are configured to generate cooling air through rotation of the field core 2, are provided to both ends of the field core 2 in the axial direction. The nut 14 forms the one end side 25 of the rotary shaft 22. Meanwhile, slip rings 13 form the another end side 26 of the rotary shaft 22.

On the one end side 25, a pulley 12 is provided to the rotary shaft 22 projecting from the front bracket 4. The pulley 12 is fastened to the rotary shaft 22 with use of the male thread formed on the one end side 25 of the rotary shaft 22 and the nut 14 mounted thereto. Thus, the pulley 12 is fitted over the one end side 25 of the rotary shaft 22 so as to be rotatable integrally with the rotary shaft 22.

Further, a rotational position detecting sensor 6 configured to detect a rotation state of the field core 2 is provided to the rotary shaft 22 projecting from the rear bracket 5 on the another side. Further, a pair of the slip rings 13 configured to supply a current to the field winding 2a are provided on a side closer to the another end side 26 with respect to the rotational position detecting sensor 6. A pair of brushes 17, which are held in sliding contact with the slip rings 13, are provided on an outer side of the rear bracket 5. The brushes 17 are held in brush holders 16.

Next, the controller 1b is described. The controller 1b includes a power circuit unit, a field circuit unit, and a control circuit unit. However, none of the power circuit unit, the field circuit unit, and the control circuit unit is clearly illustrated in FIG. 1. The power circuit unit is electrically connected to the stator winding 3a. The field circuit unit is electrically connected to the field winding 2a. The control circuit unit is configured to control the power circuit unit and the field circuit unit.

Next, with reference to FIG. 1, an operation of the controller-integrated type rotating electric machine 1 is described. The controller-integrated type rotating electric machine 1 functions as an electric motor for vehicle driving assistance, and functions as a power generator for power generation.

First, description is made of a case in which the controller-integrated type rotating electric machine 1 functions as the electric motor. DC power supplied from an external battery (not shown) to the power circuit unit is converted into a three-phase AC current through ON/OFF control of the power circuit unit, and is then supplied to the stator winding 3a.

Further, the DC power supplied from the external battery is adjusted in the field circuit unit, and is then supplied to the field winding 2a. Through the supply of the DC power, a rotating magnetic field is generated around the field winding 2a. As a result, the field core 2 is rotated together with the rotary shaft 22.

The rotation of the rotary shaft 22 is transmitted from the pulley 12 to an engine via a drive belt (not shown). Further, the control circuit unit controls the power circuit unit and the field circuit unit based on information from an external device (not shown) and the rotational position detecting sensor 6.

Next, the operation of the controller-integrated type rotating electric machine 1 when functioning as the power generator is described. When the engine is rotated, a rotational force of the engine is transmitted to the rotary shaft 22 via the drive belt and the pulley 12. As a result, the field core 2 is rotated to excite three-phase AC power in the stator winding 3a.

Then, the control circuit unit controls ON/OFF of the power circuit unit so as to convert the three-phase AC power excited in the stator winding 3a into DC power. The DC power obtained by the conversion is supplied to the external battery to charge the external battery.

In the first embodiment, the structure of the rotary shaft 22 having the flange portion 23 is employed. With the above-mentioned structure, a surface of an inner ring on a portion of a side surface of the front bearing 7, which is located on a side opposite to the pulley 12, corresponds to a terminal end surface of a fastened section to be fastened by tightening the nut 14.

As a result, the members to be fastened by tightening the nut are limited to the front bearing 7 and the pulley 12. Thus, the field core 2 having a smaller strength than those of the front bearing 7 and the pulley 12 is released from an axial force generated by tightening the nut. Specifically, through the employment of the structure of the rotary shaft 22 having the flange portion 23, the field core can be prevented from being affected by the axial force generated by a tightening force for the nut. As a result, the tightening force for the nut can be set to be larger than that in the related art. Thus, a force for restraining sliding of the pulley 12 can be improved.

Figure 2:
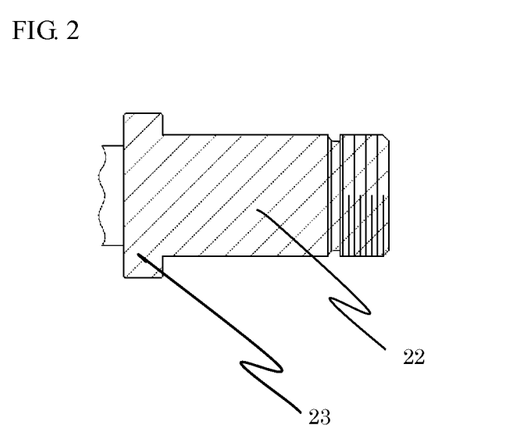
FIG. 2 is a sectional view of a rotary shaft of the rotating electric machine, which has been subjected to heat treatment, in the first embodiment of the present invention.
Figure 3:
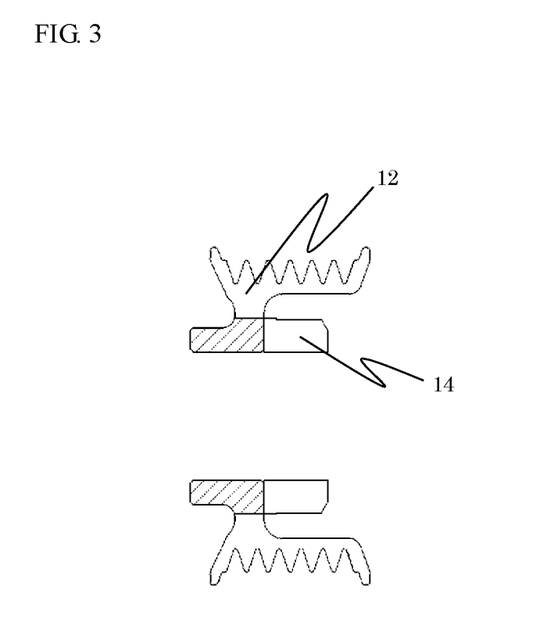
FIG. 3 is a sectional view of a pulley of the rotating electric machine, which has been subjected to the heat treatment, in the first embodiment of the present invention.

Next, description is made of a case in which a further improvement of the force for restraining the sliding of the pulley 12 is achieved through heat treatment performed on at least one of the components. FIG. 2 is a sectional view of the rotary shaft 22, which has been subjected to heat treatment, in the first embodiment of the present invention. FIG. 3 is a sectional view of the pulley 12, which has been subjected to the heat treatment, in the first embodiment of the present invention. In FIG. 2 and FIG. 3, hatched portions correspond to portions having been subjected to the heat treatment.

As illustrated in FIG. 2, through the heat treatment performed on the rotary shaft 22 and the flange portion 23, a resistance against a compressive force in the flange portion 23 and a resistance against a tensile force in the thread portion of the rotary shaft 22, which are generated by tightening the nut 14, can be increased.

Further, as illustrated in FIG. 3, through the heat treatment performed on a portion of the pulley 12, on which a fastening force acts, a resistance against a compressive force generated in the pulley 12 by tightening the nut 14 can be increased.

As described above, through the heat treatment performed on the portions of the rotary shaft 22 and the pulley 12, on which the fastening force acts, the tightening force for the nut 14 can be set to be larger. As a result, the force for restraining the sliding of the pulley 12 can be further improved. The ranges of the heat treatment illustrated in FIG. 2 and FIG. 3 are examples. When the heat treatment is performed on the rotary shaft 22 and the pulley 12 over ranges equal to or larger than the illustrated ranges, a higher effect of the resistances can be achieved.

As described above, according to the first embodiment, the rotary shaft has such a structure that the flange portion, which is a portion having a larger diameter than that of the other portion of the rotary shaft, is arranged between the front bearing and the field core. With the structure described above, the field core can be prevented from being affected by the axial force generated by the tightening force for the nut. Hence, the tightening force for the nut can be set to be larger. As a result, the rotating electric machine with the improved force for restraining the sliding of the pulley can be obtained.

Further, according to the first embodiment, the structure of fixing the rotary shaft and the nut through welding may be employed. With the above-mentioned structure, when an excessive input torque is applied, loosening of the nut can be prevented. Further, even when an excessive input torque is applied to cause the sliding of the pulley, co-rotation and dropping of the nut can be suppressed.

Second Embodiment

In a second embodiment, description is made of a case in which improvement of the force for restraining the sliding of the pulley 12 is achieved by suitably setting outer-diameter dimensions of the rotary shaft 22.

Figure 4:
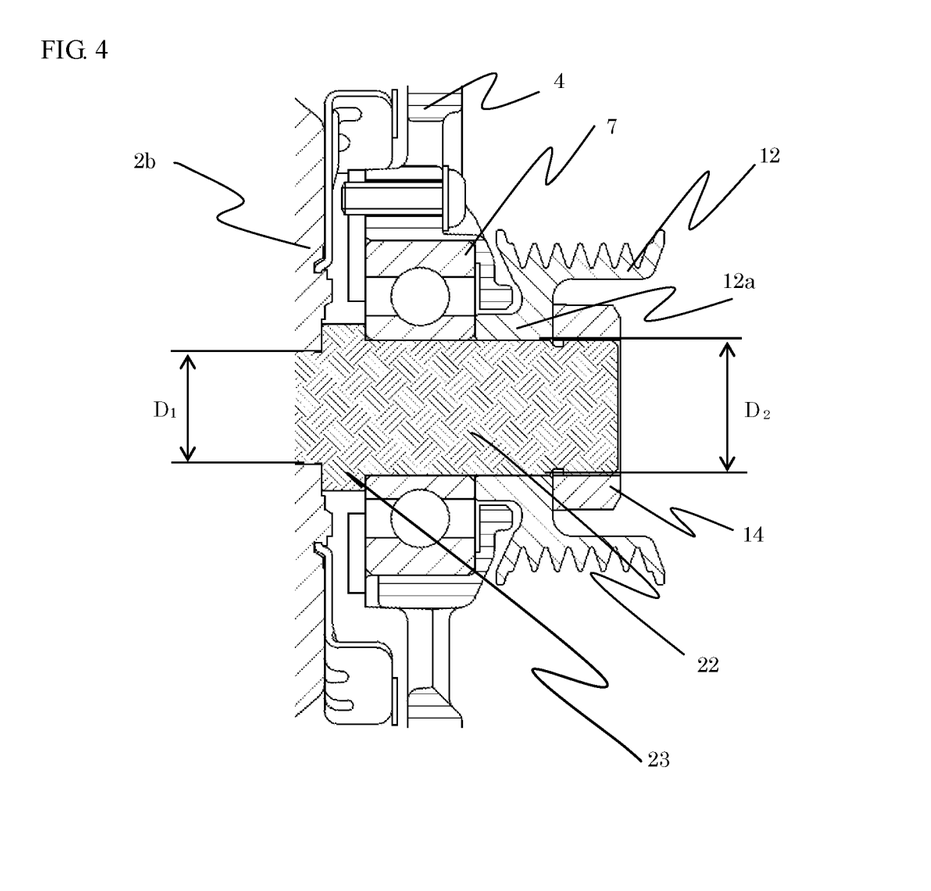
FIG. 4 is an enlarged sectional view of a rotary shaft of a rotating electric machine according to a second embodiment of the present invention and its surroundings.

FIG. 4 is an enlarged sectional view of a rotary shaft of a rotating electric machine according to the second embodiment and its surroundings. An outer diameter of a portion of the rotary shaft 22 on the field core 2 side with respect to the flange portion 23 is represented by $D_1$. An outer diameter of a portion of the rotary shaft 22 on the front bearing 7 side with respect to the flange portion 23 is represented by $D_2$. For the outer diameters of the rotary shaft 22, $D_2$ is set to be larger than $D_1$. The same reference symbols as those in FIG. 1 denote the same or similar components, and a detailed description thereof is omitted.

The outer diameter of the rotary shaft 22 according to the second embodiment is set so as to satisfy a relation: $D_2 > D_1$. Specifically, the outer diameter of the portion of the rotary shaft 22 according to the second embodiment 2 on the one end side 25, which is formed as the male thread, is set to be larger. As a result, a resistance against the tensile force generated in the rotary shaft 22 by tightening the nut 14 can be improved. Further, the force for restraining the sliding of the pulley 12 can be improved by setting the tightening force for the nut 14 to be larger.

Third Embodiment

In a third embodiment, description is made of a case in which improvement of the force for restraining the sliding of the pulley 12 is achieved by suitably setting the outer-diameter dimension of the rotary shaft 22, an outer diameter of the inner ring of the front bearing 7, and an outer-diameter dimension of a boss portion 12a of the pulley 12.

Figure 5:
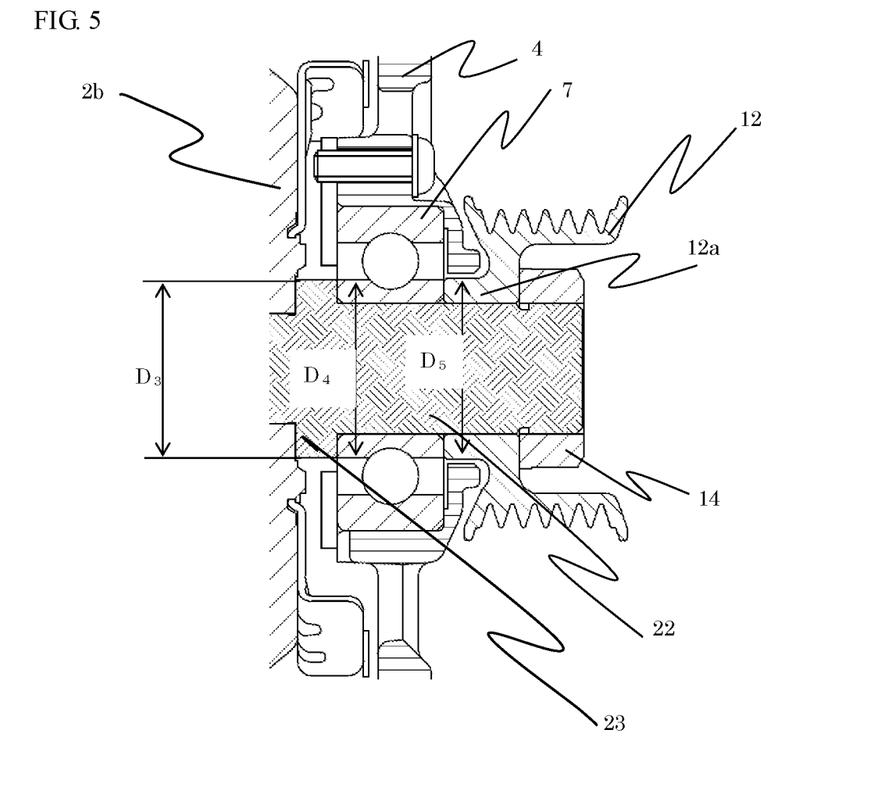
FIG. 5 is an enlarged sectional view of a rotary shaft of a rotating electric machine according to a third embodiment of the present invention and its surroundings.

FIG. 5 is an enlarged sectional view of a rotary shaft of a rotating electric machine according to the third embodiment of the present invention and its surroundings. An outer diameter of the flange portion 23 of the rotary shaft 22 is represented by $D_3$. An outer diameter of the inner ring of the front bearing 7 is represented by $D_4$. An outer diameter of the boss portion 12a of the pulley 12, which is brought into contact with the front bearing 7, is represented by $D_5$. For the outer diameters, each of the outer diameters $D_3$ and $D_5$ is set equal to $D_4$. The same reference symbols as those in FIG. 1 denote the same or similar components, and a detailed description thereof is herein omitted.

In the third embodiment, the structure in which the outer-diameter dimensions $D_3$ and $D_5$ are set equal to $D_4$ is employed. With the above-mentioned structure having the same outer diameters, the tightening force for the nut is transmitted to the flange portion 23 having the outer diameter $D_3$ via the pulley 12 having the outer diameter $D_5$ and the front bearing 7 having the outer diameter $D_4$.

As a result, a resistance against a compressive force generated in the flange portion 23 of the rotary shaft 22 and the pulley 12 by tightening the nut 14 can be increased. Further, the force for restraining the sliding of the pulley 12 can be improved by setting the tightening force for the nut 14 to be larger.

Fourth Embodiment

In a fourth embodiment, description is made of a case in which improvement of the force for restraining the sliding of the pulley 12 is achieved by suitably changing a shape of the flange portion 23.

Figure 6:
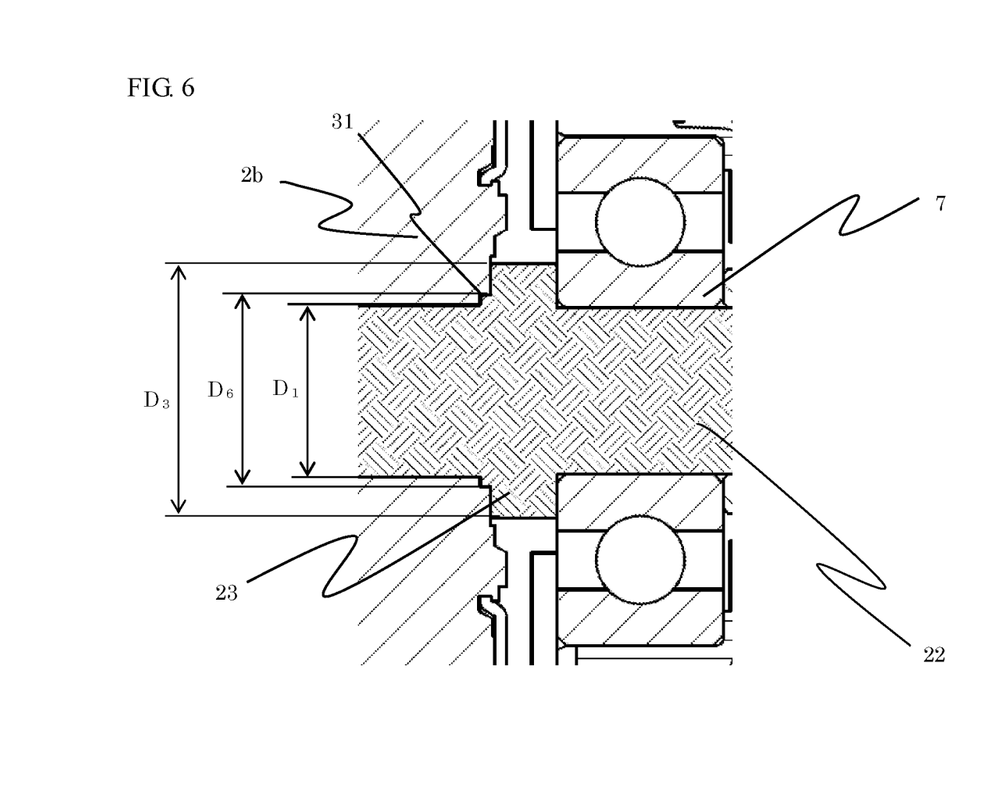
FIG. 6 is an enlarged sectional view of a rotary shaft of a rotating electric machine according to a fourth embodiment of the present invention and its surroundings.

FIG. 6 is an enlarged sectional view of a rotary shaft of a rotating electric machine according to the fourth embodiment of the present invention and its surroundings. An outer peripheral surface of a portion of the flange portion 23 of the rotary shaft 22 according to the fourth embodiment, with which the field core 2b is brought into contact, is formed to have a step-like shape. An outer diameter of a step 31 portion of the outer peripheral surface, at which the flange portion 23 of the rotary shaft 22 and the field core 2 are brought into contact with each other, on the field core 2b side with respect to the flange portion 23 of the rotary shaft 22, is represented by $D_6$. Further, an outer diameter of a portion of the rotary shaft 22 on the field core 2b side with respect to the flange portion 23 is represented by $D_1$. An outer diameter of the flange portion of the rotary shaft 22 is represented by $D_3$.

The outer diameters $D_1$, $D_3$, and $D_6$ of the rotary shaft 22 are set so as to satisfy a relation: $D_1<D_6<D_3$. The portion 31 corresponding to the outer diameter $D_6$ is formed so as to be embedded into the field core 2b.

Figure 7:
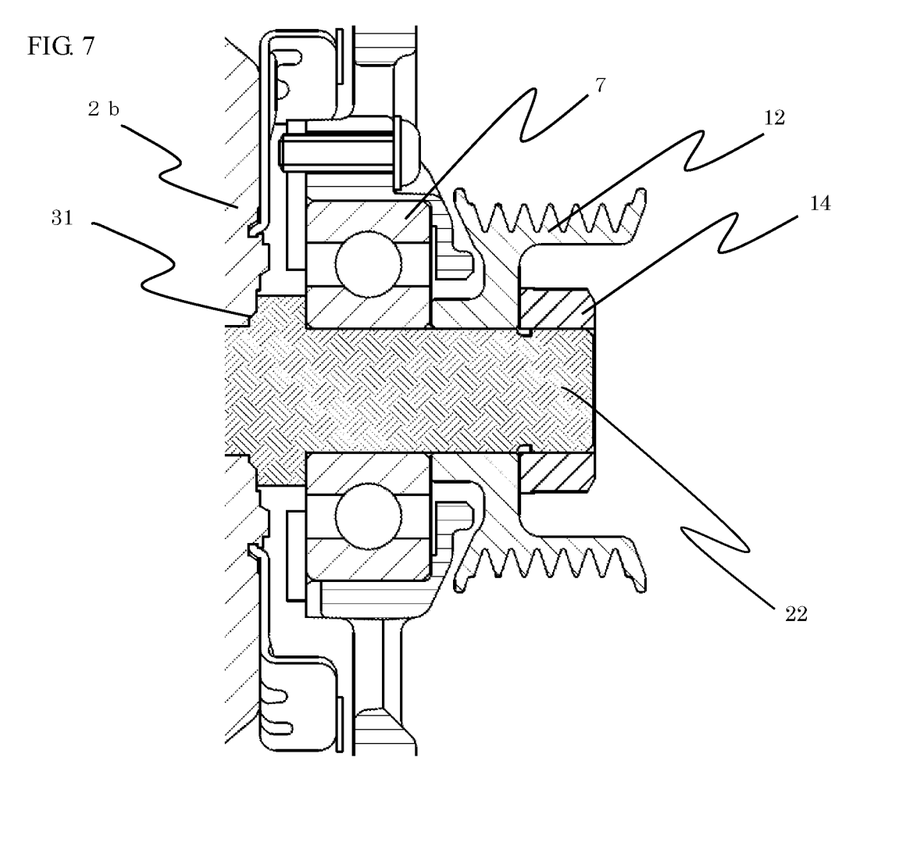
FIG. 7 is an enlarged sectional view of a rotary shaft of a rotating electric machine according to a modification example of the fourth embodiment of the present invention and its surroundings.

FIG. 7 is an enlarged sectional view of a modification example of the rotary shaft of the rotating electric machine according to the fourth embodiment of the present invention and its surroundings, for illustrating a modification example of the portion of the rotary shaft, which has the outer diameter $D_6$ of FIG. 6. The portion 31 having the outer diameter $D_6$, being a portion of an outer peripheral surface at which the flange portion 23 of the rotary shaft 22 and the field core 2b are brought into contact with each other, is formed to have a tapered shape. The same reference symbols as those in FIG. 1 denote the same or similar components, and a detailed description thereof is omitted.

When an excessive input torque acts on the pulley 12 from the engine side via the belt, a belt tension increases. An excessive bending stress is generated at an abutment surface of the rotary shaft 22 between the field core 2b and the flange portion 23 of the rotary shaft 22 by the belt tension. Thus, when the outer diameters of the rotary shaft 22 are set so as to satisfy a relation: $D_1<D_6<D_3$, a resistance against the bending stress generated on the abutment surface can be increased. Further, a fatigue life against a bending load acting on the rotary shaft 22 can be prolonged.

Further, as illustrated in FIG. 7, even when the portion 31 having the outer diameter D6, which is contained in the outer peripheral surface of the portion at which the flange portion 23 of the rotary shaft 22 and the field core 2b are brought into abutment against each other, is formed to have a tapered shape, the same effects are obtained. Thus, the resistance against the bending stress generated on the abutment surface can be increased. Further, the fatigue life against the bending load acting on the rotary shaft 22 can be prolonged.

Fifth Embodiment

In a fifth embodiment, description is mad of a case in which improvement of the force for restraining the sliding of the pulley 12 is achieved by suitably changing a method of fixing the pulley 12 and the rotary shaft 22 to each other.

Figure 8A:
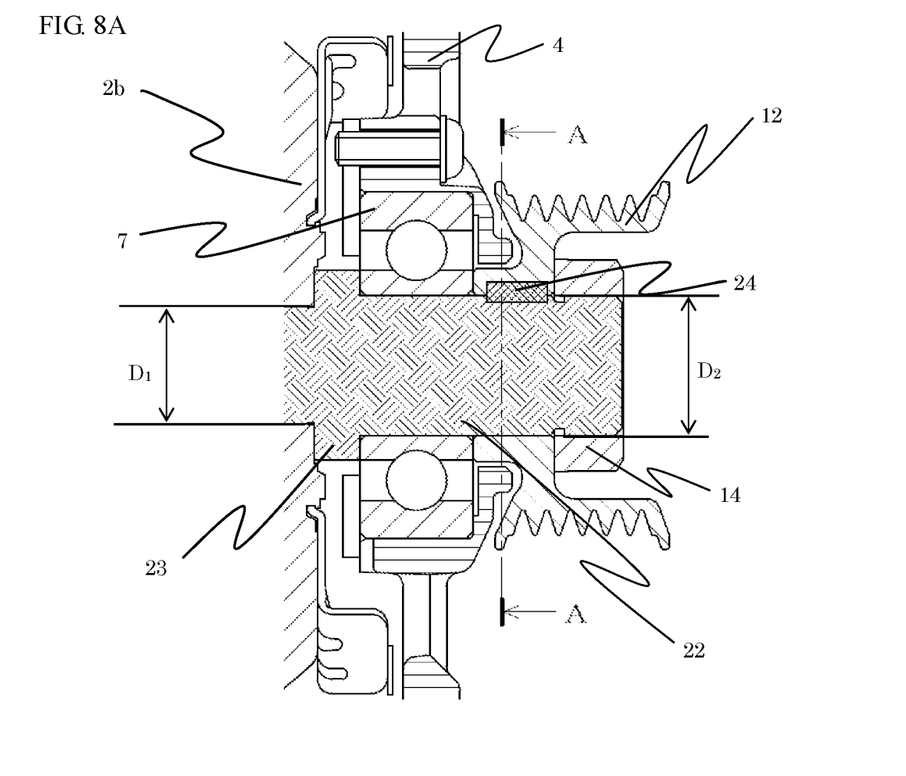
FIG. 8A is an enlarged sectional view of a rotary shaft of a rotating electric machine according to a fifth embodiment of the present invention and its surroundings.
Figure 8B:
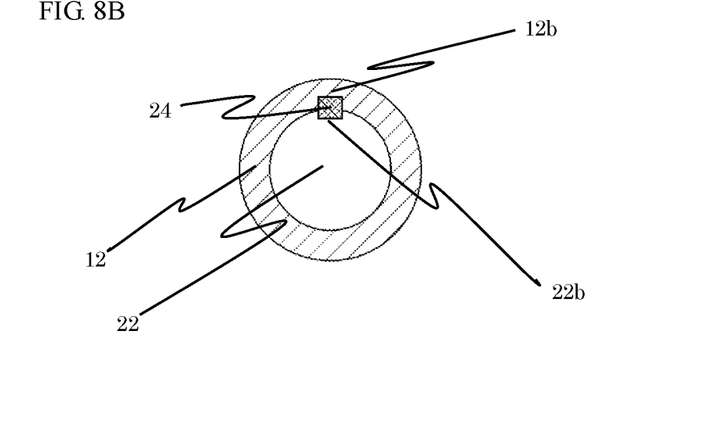
FIG. 8B is a sectional view taken along the line A-A of FIG. 8A.

FIG. 8A is an enlarged sectional view of a rotary shaft of a rotating electric machine according to a fifth embodiment of the present invention and its surroundings. Further, FIG. 8B is a sectional view taken along the line A-A of FIG. 8A. The rotary shaft 22 according to the fifth embodiment has a key groove 22b. The pulley 12 has a key groove 12b. The key groove 22b of the rotary shaft 22 and the key groove 12b of the pulley 12 are arranged so that a key 24 is fitted therein.

An outer diameter of a portion of the rotary shaft 22 on the field core 2 side with respect to the flange portion 23 is represented by $D_1$. An outer diameter of a portion of the rotary shaft 22 on the front bearing 7 side with respect to the flange portion 23 is represented by $D_2$. For the outer diameters of the rotary shaft 22, $D_2$ is set to be larger than $D_1$.

Through employment of a structure in which the key 24 is fitted into the key groove 22b of the rotary shaft 22 and the key groove 12b of the pulley 12, a fastening force for the rotary shaft 22 and the pulley 12 can be improved, and a frictional force generated by the axial force generated in the thread can be increased. As a result, in comparison to the structure that enables the force for restraining the sliding of the pulley 12 to be increased as described above in the first to fourth embodiments, even when a force equal to or larger than the restraining force is applied, unnecessary sliding of the pulley 12 and further loosening of the nut 14 can be suppressed.

Sixth Embodiment

In a sixth embodiment, description is made of a case in which improvement of the force for restraining the sliding of the pulley 12 is achieved by suitably changing a method of fixing the pulley 12 and the rotary shaft 22 to each other through employment a structure different from that of the fifth embodiment.

Figure 9A:
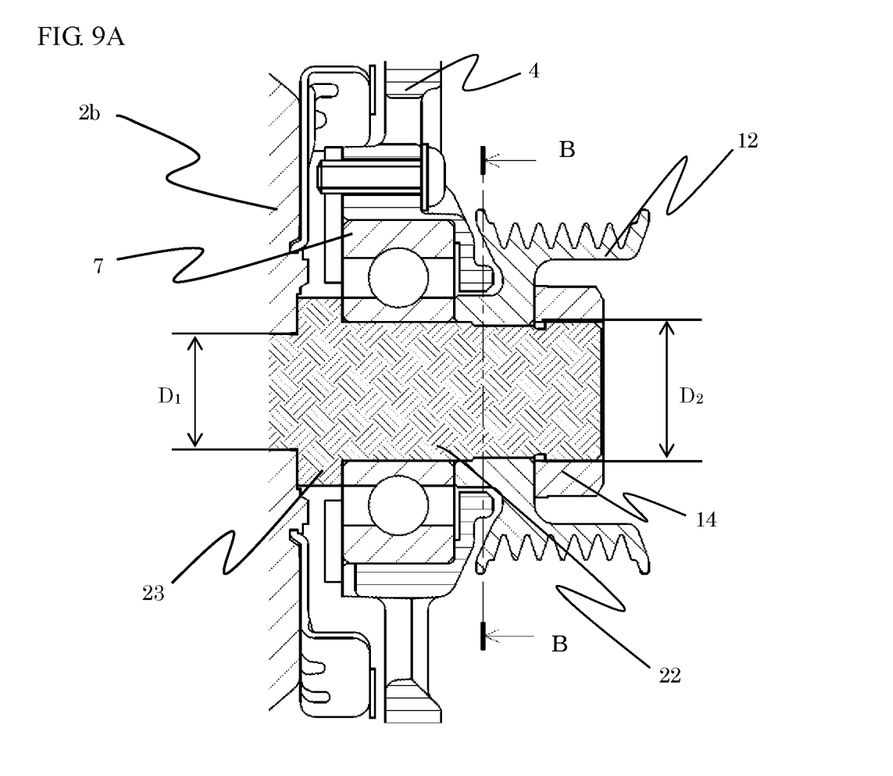
FIG. 9A is an enlarged sectional view of a rotary shaft of a rotating electric machine according to a sixth embodiment of the present invention and its surroundings.
Figure 9B:
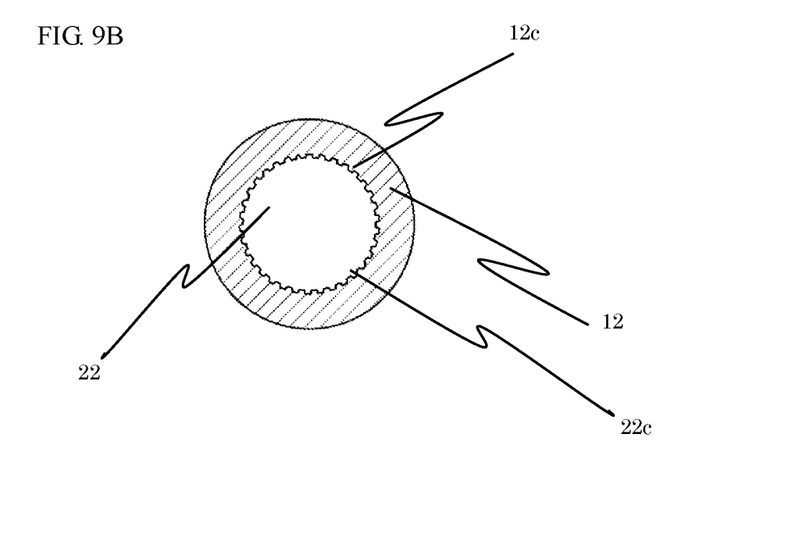
FIG. 9B is a sectional view taken along the line B-B of FIG. 9A.

FIG. 9A is an enlarged sectional view of a rotary shaft of a rotating electric machine according to a sixth embodiment of the present invention and its surroundings. Further, FIG. 9B is a sectional view taken along the line B-B of FIG. 9A. A spline 22c is formed on an outer peripheral surface of the rotary shaft 22 according to the sixth embodiment. A spline 12c is formed on an inner peripheral surface of the pulley 12. The spline 22c of the rotary shaft 22 and the spline 12c of the pulley 12 are formed so as to be meshed with each other. Thus, the rotary shaft 22 and the pulley 12 have the splines 22c and 12c, respectively, on surfaces to be brought into contact with each other, and the spline 22c and the spline 12c are meshed with each other.

An outer diameter of a portion of the rotary shaft 22 on the field core 2 side with respect to the flange portion 23 is represented by $D_1$. An outer diameter of a portion of the rotary shaft 22 on the front bearing 7 side with respect to the flange portion 23 is represented by $D_2$. For the outer diameters of the rotary shaft 22, $D_2$ is set to be larger than $D_1$. When the outer diameter $D_2$ is increased, the number of teeth of each of the splines can be increased.

Through employment of the structure in which the spline 22c of the rotary shaft 22 and the spline 12c of the pulley 12 are meshed with each other, the fastening force for the rotary shaft 22 and the pulley 12 can be improved, and the frictional force generated by the axial force of the thread can be increased. As a result, in comparison to the structure that enables the force for restraining the sliding of the pulley 12 to be increased as described above in the first to fourth embodiments, even when a force equal to or larger than the restraining force is applied, unnecessary sliding of the pulley 12 and further loosening of the nut 14 can be suppressed.

Further, through employment of the structure in which the outer diameters of the rotary shaft are set so as to satisfy a relation: $D_2 > D_1$, the number of teeth of each of the splines can be increased. As a result, a load applied on one tooth of each of the splines is reduced, and hence a life of the splines can be prolonged.

REFERENCE SIGNS LIST 1 controller-integrated type rotating electric machine (rotating electric machine), 2, 2b field core, 7 front bearing, 12 pulley, 12a boss portion of pulley, 12b key groove of pulley, 12c spline of pulley, 14 nut, 22 rotary shaft, 22b key groove of rotary shaft, 22c spline of rotary shaft, 23 flange portion of rotary shaft, 24 key, 25 one end side of rotary shaft, 26 another end side of rotary shaft, 31 step portion of outer peripheral surface at which flange portion of rotary shaft and field core are brought into abutment against each other, $D_1$ outer diameter of portion of rotary shaft on field core side with respect to the flange portion, $D_2$ outer diameter of portion of rotary shaft on front bearing side with respect to flange portion, $D_3$ outer diameter of flange portion of rotary shaft, $D_4$ outer diameter of inner ring of front bearing, $D_5$ outer diameter of boss portion of pulley

The invention claimed is:

1. A rotating electric machine, comprising:
a rotary shaft rotatably supported by a front bearing and a rear bearing;
a field core firmly fixed to the rotary shaft; and
a pulley fitted over the rotary shaft on one end side so as to be rotatable integrally with the rotary shaft,
wherein the pulley, the front bearing, and the field core are arranged in a stated order from the one end side of the rotary shaft toward another end side of the rotary shaft,
wherein the pulley is fastened to the rotary shaft with use of a male thread formed on the one end side of the rotary shaft and a nut to be mounted to the male thread, and
wherein the rotary shaft has an integral flange portion, which projects radially outward, and is arranged at a position between the front bearing and the field core in an axial direction of the rotary shaft,
wherein an outer peripheral surface, at which the flange portion and the field core are brought into abutment against each other, has a step in the axial direction of the rotary shaft.

2. The rotating electric machine according to claim 1, wherein the rotary shaft and the pulley each have a key groove, and are fixed to each other by insertion of a key into the key groove.

3. The rotating electric machine according to claim 1, wherein the rotary shaft and the pulley each have a spline formed on a surface to be brought into contact with each other, and are fixed to each other by meshing between the spline of the rotary shaft and the spline of the pulley.

4. The rotating electric machine according to claim 1, wherein the nut is fixed to the rotary shaft by welding under a state of being mounted to the male thread.

5. The rotating electric machine according to claim 1, wherein at least a part of each of the rotary shaft and the flange portion is subjected to heat treatment.

6. The rotating electric machine according to claim 1, wherein at least a part of each of the pulley is subjected to heat treatment.

7. The rotating electric machine according to claim 1, wherein an outer diameter of a portion of the rotary shaft on the one end side with respect to the flange portion is set to be larger than an outer diameter of a portion of the rotary shaft on another end side with respect to the flange portion.

8. The rotating electric machine according to claim 1, wherein an outer diameter of the flange portion, an outer diameter of an inner ring of the front bearing, and an outer diameter of a boss portion of the pulley, which is brought into contact with the front bearing, are set to be equal to each other.

9. The rotating electric machine according to claim 1, wherein the step has a tapered shape.

* * * * *